(Model.)

C. W. LONG.
VEHICLE WHEEL.

No. 322,188. Patented July 14, 1885.

WITNESSES:
C. Neveux
C. Sedgwick

INVENTOR:
C. W. Long
BY Munn & Co.
ATTORNEYS.

UNITED STATES PATENT OFFICE.

CHARLES W. LONG, OF EATON, OHIO.

VEHICLE-WHEEL.

SPECIFICATION forming part of Letters Patent No. 322,188, dated July 14, 1885.

Application filed May 20, 1885. (Model.)

*To all whom it may concern:*

Be it known that I, CHARLES W. LONG, of Eaton, in the county of Preble and State of Ohio, have invented a new and Improved Wheel, of which the following is a full, clear, and exact description.

The object of my invention is to provide a new and improved wheel without a hub, which can be used as a master-wheel on reapers, or for other purposes.

The invention consists in the combination, with a circular rim, of a frame mounted to turn within the same.

Reference is to be had to the accompanying drawings, forming a part of this specification, in which similar letters of reference indicate corresponding parts in all the figures.

Figure 1:
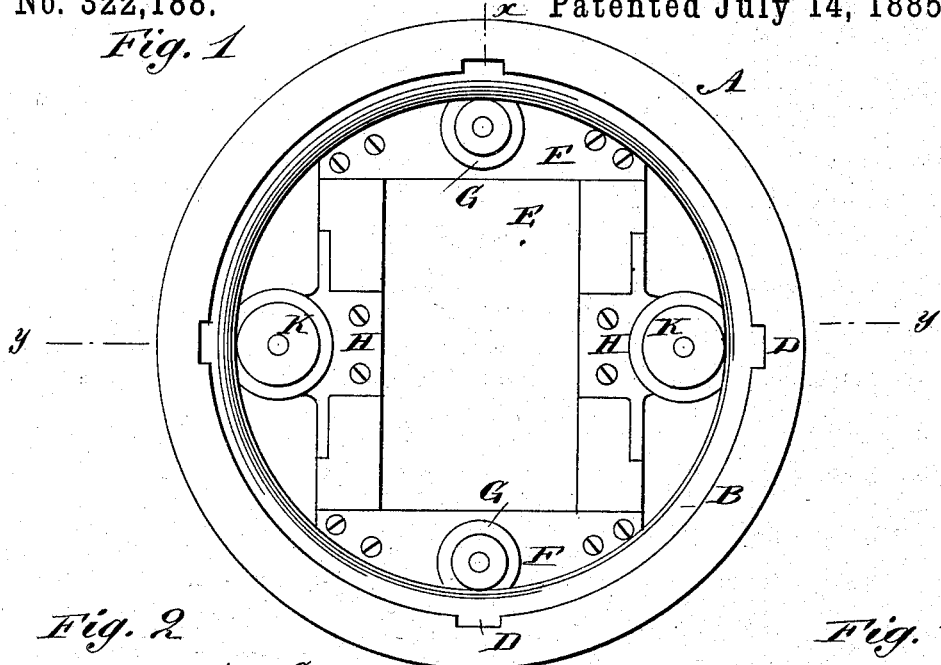
Figure 2:
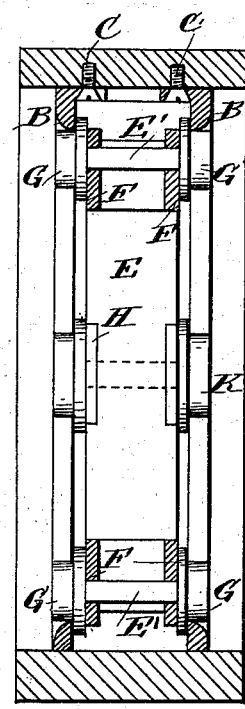
Figure 3:
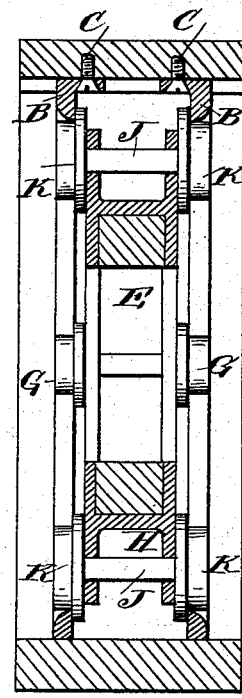

Figure 1 is a side view of my improved hubless wheel. Fig. 2 is a cross-sectional view of the same on the line $x\ x$, Fig. 1. Fig. 3 is a sectional plan view of the same on the line $y\ y$, Fig. 1.

On the inner side of the wide circular rim A two circular tracks, B, are secured by screws C, the said tracks having lugs D, which fit in recesses in the inner surface of the rim, through which lugs the screws are passed.

Within the rim a square or oblong frame, E, is placed, the ends of which are formed of plates F, in which shafts E', carrying flanged rollers G, are mounted, the rollers running on the tracks B. On the side pieces of the frame forked pieces H are secured, in which shafts J are mounted, flanged rollers K being mounted on the ends of the shafts, the said rollers also running on the tracks B. As rollers G and K run on the tracks B the frame E can be revolved within the rim, or the rim can revolve on the frame, the rollers reducing the friction to a minimum.

The above-described wheel, which is hubless, can be used as a master-wheel on reapers, making the reapers run more easily, making the draft less, and giving more power. The grain can go through the wheel, and thus no power is required to carry it up over the wheel. The wheel can also be used for a pulley, or in other places where a wheel with a hub cannot be used.

Having thus described my invention, I claim as new and desire to secure by Letters Patent—

1. The combination, with the circular rim A, of the tracks B, having lugs D, fitting in recesses in the inner surface of the rim, and of a frame within the circular rim, which frame is provided with rollers running on the above-mentioned tracks, substantially as herein shown and described.

2. The combination, with the circular rim, of tracks secured on the inner side of the same, a frame within the rim, formed of side pieces united by plates F, rollers mounted on shafts in the plates, and of forked pieces on the side pieces, in which forked pieces shafts are mounted having rollers on the ends, substantially as herein shown and described.

CHARLES W. LONG.

Witnesses:
JAMES A. GILMORE,
DANIEL PETERS.